3,135,812
PROCESS FOR THE CONTINUOUS MANUFACTURE OF HIGH GRADE ACRYLIC FIBERS
Masakazu Taniyama and Masahiko Hatano, Itano-gun, Japan, assignors to Toho Rayon Kabushiki Kaisha, Tokyo, Japan, a corporation of Japan
Filed Dec. 28, 1960, Ser. No. 79,055
9 Claims. (Cl. 264—182)

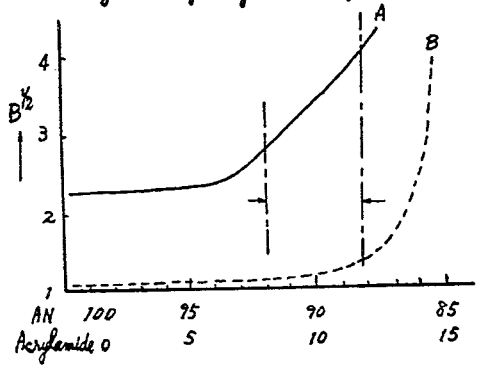
Fig. 1. Coagulating Structure of Polymer
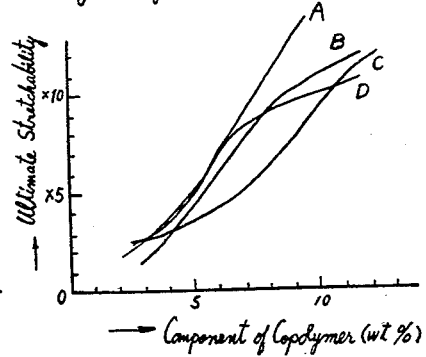
Fig. 2. Polymer Structure vs Elongation
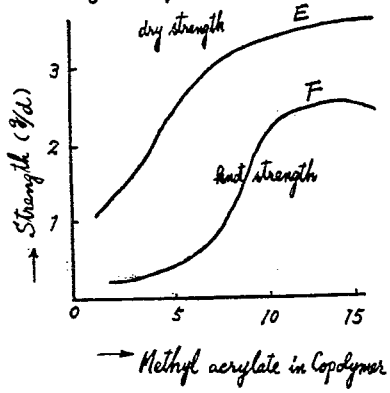
Fig. 3. Polymer Structure and Mechanical strength
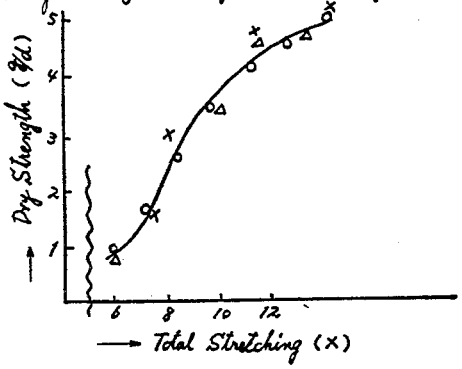
Fig. 4. Elongation and Strength
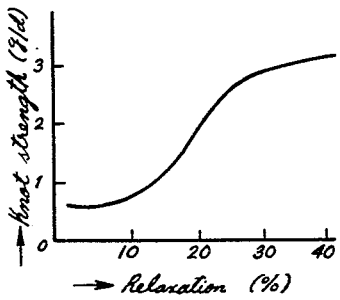
Fig. 5. Relaxation vs. Knot strength
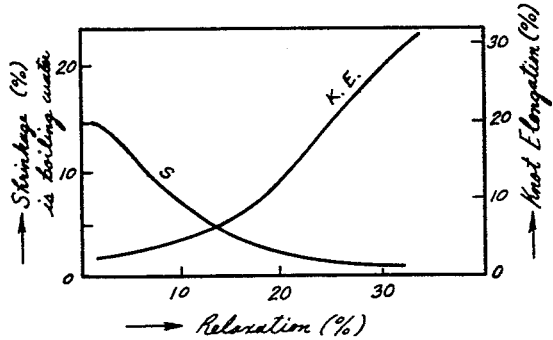
Fig. 6. Relaxation vs. Shrinkage, Knot Elongation United States Patent Office  3,135,812
Patented June 2, 1964

The present invention relates to a process for continuous manufacturing high grade acrylic fibers at low cost by polymerizing acrylonitrile with other comonomers of specific composition in a concentrated aqueous salt solution containing zinc chloride under a specified polymerization system and by spinning directly the resulting copolymer solution. Hitherto it has been thought difficult to manufacture usable fibers by using a coagulating bath of low concentration and normal temperature in the case where a concentrated aqueous solution of zinc chloride is used as the solvent. This invention not only enables same but also produces such fibers having excellent characteristics in knot strength, thermal stability and elasticity.

Solvents for acrylonitrile polymers have hitherto been organic solvents, such as dimethyl-formamide, dimethyl-acetoamide, dimethyl sulfoxide and ethylene carbonate; inorganic acids, such as sulphuric and nitric acids; and concentrated aqueous solution of inorganic salts, such as sodium rhodanate and zinc chloride. However, the organic solvents are generally expensive, while the inorganic acids tend to hydrolyze acrylonitrile polymer. The inorganic solvents are available at moderate prices, but there have been many technical disadvantages in the case of using them.

In the ordinary preparation of spinning solution, many unit procedures have usually been assembled in one process wherein monomers are subjected to suspension polymerization in water and the polymer precipitated is washed, dried, pulverized and then dissolved in solvent. In these cases, the technique is too complicated to produce polymers with uniform quality and moreover, a large sum of expenses are needed in the drying and pulverization of the polymer. On the other hand, if monomer mixture is continuously polymerized in a solvent which can dissolve the polymer formed, and if thus resulting polymer solution can be directly spun to form fiber, a strikingly simplified process may be attained for the manufacture of fibers. Such an idea of performing "solution-polymerization" has long been present. However, no such actual examples have been heard of in connection with the manufacture of fibers in the industry. The reasons for this are that, in the case of organic solvents, such as dimethyl formamide and dimethyl acetoamide, if used as polymerization medium, it is hard to obtain polymers of sufficiently high molecular weight and high relative conversions and that it is difficult to recover the solvent at high purity which can be useful for repeating polymerization process. However, there has been no catalyst suitable for polymerization in concentrated inorganic acid solutions. On the other hand, in the case of zinc chloride solvent, it has been clarified from exhaustive investigations that, the solution-polymerization can easily be carried out with usual catalysts such as persulphates or organic peroxides.

It has been known hitherto that acrylonitrile is polymerized homogeneously in a concentrated aqueous zinc chloride solution. However, since viscosity of the polymer solution thus obtained is too high to spin and the coagulated tow tends to have numerous voids, it is very hard to obtain practically useful fibers. In order to eliminate above disadvantages, other inorganic salts such as $CaCl_2$, $MgCl_2$, etc. or an organic peptiizer such as DMF or DMA has been tried to be mixed in the polymer solution (vid. U.S. Patents No. 2,648,647 and No. 2,648,648), and also the other processes, for instance, cooling the coagulating bath below the ordinary temperature or keeping the coagulating bath at a high concentration have been applied (vid. U.S. Patent No. 2,790,700). Those processes are, however, unfavorable to be adopted from the economical and technical point of view. Moreover, even under such conditions, it has been difficult to manufacture substantially useful fiber in an industrial scale in an easily reproducible manner.

Based on the comprehensive investigations on the solution-polymerization as well as spinning, the present inventors have attained a knowledge that the composition of polymers is a key to solve those problems, and have reached to the present invention on the continuous manufacture of acrylic fibers through the solution-polymerizing and spinning process.

The stretching and relaxation of the coagulated tow spun out in the coagulating bath must be carried out under special conditions necessary for manufacturing good fibers. Said degrees of stretching and relaxation depend on the molecular structure of the polymer and also on the interaction between the solvent and the polymer. The acrylonitrile polymer, which has strong polar radicals (nitrile radical), has a remarkably strong molecular cohesive force and forms a compact coagulated structure, concurrent with the solidification in coagulating bath. Therefore, in order to avoid the above-mentioned behavior that might make the subsequent stretching and relaxation difficult, co-polymers of various compositions have been prepared and a detailed study has been carried out with respect to the conditions of coagulation, stretching and relaxation.

FIG. 1 represents in solid line A results of X-ray investigation on air-dried coagulant in the case of acrylamide used as a component of the copolymer and, in broken line B, those of the stretched and relaxed fiber. In this figure, B½ showing half height width at $2\theta=17°$ relates to the crystallinity of the coagulant and means that the polymer structure is more amorphous as B½ becomes larger. As shown in FIG. 1, until the component of copolymer reaches 6–7%, a compact structure is formed, but the more component gives evidently the more random structure FIG. 2 represents that, in parallel with this phenomenon, the stretching ability of the coagulant shows a rapid increase after the component of copolymer has exceeded 6–7%. In the figure, A, B, C and D represent the components of copolymer respectively. It is natural that when comonomer content of the polymer is increased, the structure of the polymer becomes more random and results in an increased ability of stretching. The most important problem is that the fiber structure is fixed after stretching and relaxation, that is one of the necessary conditions for getting useful fibers. Generally, as the copolymer component increases, the stretching and relaxation abilities increase, while the mechanical properties and thermal stabilities, which are important for fibers, become deteriorated. The mechanical properties and thermal resistance are likewise dependent on the manner of coagulation. From this point of view, the stretched and relaxed fiber structure is shown in broken line B of FIG. 1, and a stable crystalline structure is held until the comonomer component of the polymer is increased to 12 weight percent. Above the 12 weight percent of comonomer component, the crystallinity of fiber becomes worse and the elongation of fiber becomes too large and the thermal stability becomes remarkably decreased.

FIG. 3 illustrates, as an example, the mechanical properties of the fibers obtained when methyl acrylate is used as a copolymer component. It is also evident from this, that no fibers having useful mechanical properties can be obtained below 6 to 7% of co-polymer component. In this figures E shows dry strength and F knot strength.

Namely, the present inventors have found an important technique that useful fibers can be manufactured easily only when the copolymer component ranges from 8 to 12% for using a zinc chloride solution as the solvent. In such a specific copolymerization, there is no need of cooling a coagulating bath below room temperature, and the good spinning can easily be carried out at room temperature in water or in a bath of aqueous zinc chloride solution at low concentrations below 20%. Since residual salts in fibers exert harmful influences upon fiber properties such as whiteness and dyeability, removal of the salts is quite an important problem. Table 1 shows the relationship between salt concentration of the coagulating bath and residual salts under the same condition as to water washing. A bath having a lower salt concentration makes less residual salt and has the advantages that the washing process may be more simplified and the required time more shortened.

TABLE 1

| Salt Concentration of Coagulating Bath | Bath Temperature, °C. | Residual Salt |
|---|---|---|
| $ZnCl^2$: | | |
| 0% | 20 | 0.25 |
| 5% | 20 | 0.15 |
| 10% | 20 | 0.10 |
| 15% | 20 | 0.13 |
| 20% | 20 | 0.13 |
| 25% | 20 | 0.25 |
| 30% | 20 | 0.45 |
| 40% | 20 | 0.80 |

In the case of solvents such as dimethyl formamide, ethylene carbonate and sodium rhodanate, the manufacture of fibers is possible even below 8% of comonomer component because the small amount of residual solvent in fibers has plasticizer effect. But in the case of zinc chloride, the 8 to 12% comonomer components must be an inevitable and necessary condition for the manufacture of useful fibers from the information of characteristic behavior of the solvent. Furthermore, the important problem for making an excellent fiber is not only that our polymers contain 8 to 12% comonomer but that it is positively necessary to give stretching over 8 times of its original length after coagulation and successive relaxation over 20%. In the wet spinning using a zinc chloride solution as the solvent, the stretching of spun tow is possible only in the said appropriate composition of copolymer. The fiber stretched in such a manner has an extremely large amount of internal strain. The knot strength is exceedingly small and the resistance against folding is also weak. Those disadvantages are improved by subjecting to the relaxation treatment after the stretching.

FIG. 4 represents a relationship between stretching ratio and fiber strength, wherein O shows stretching in boiling water, Δ in steam and X by dry heating. As seen in said figure, thermal stretching may make tensile strength of coagulated tows increase, but can not produce enough knot strength for practical fibers. The present inventors have found that knot strength may be increased, as seen in FIG. 5, by relaxing under heating after stretching treatment of fibers and relaxation over 20% may give enough knot strength for practical use. Thus relaxation not only increases knot strength but also remarkably improves fiber properties such as knot strength, thermal stability etc. as seen in FIG. 6. Furthermore, it has been also found that degree of fibrilization may be advantageously lowered by the relaxation, one example of which is shown by a following table.

TABLE 2

| Relaxation (percent) | Fibrilization Degree (percent) |
|---|---|
| 0 | 13 |
| 10 | 7 |
| 20 | 3 |
| 30 | 1 |

Relaxation over 20% after stretching over 8 times of its original length is an indispensible condition for obtaining excellent and characteristic properties of fibers.

Of course, in order to improve the dyeing property of the fiber, a special kind of monomer can be used as one component of copolymer. It has also been known that as a basic monomer suitable for zinc chloride series solvent particularly vinyl imidazol derivative such as N-vinyl-4-β-hydroxyethyl imidazol, N-vinyl-2-β-hydroxyethyl imidazol, etc. and as an acidic monomer vinyl sulfonic acid, acrylic acid or allyl sulfonic acid give the most satisfactory results into improving dyeability.

Further, a detailed study on those copolymer structure has shown that a combination of a vinyl monomer such as methyl acrylate or acrylamide with said basic or acidic monomers is the most suitable comonomer components, where the total comonomer content must be 8-12 weight percent of the copolymer.

The present inventors have succeeded to carry out stretching over 8 times and relaxation over 20% for manufacturing useful fibers easily only by copolymerizing 8 to 12% of comonomer with acrylonitrile when a concentrated aqueous solution of zinc chloride is used as the solvent, based upon the fundamental knowledge described above. Thus it has been found to manufacture excellent acrylic fibers by selecting the particular range of copolymer composition and conditions for stretching and relaxation. In order to economically carry out same and to obtain excellent spinning solution suitable therefore, it is possible to combine a particular solution polymerization process to be described hereinafter so that continuous spinning using an aqueous solution of zinc chloride may be industrialized.

The polymer solution obtained usually by solution polymerization in an ordinary apparatus of polymerization includes a large quantity of air foams and therefore it must be defoamed before spinning operation. However, the zinc chloride series solvent is very hard to be defoamed due to its special property of interfacial chemistry, and this point is a large disturbance in an industrial scale. Relationship between polymerization conditions and required time for defoaming will be exemplarily shown according to our experiment;

Table 3

| Manner for Solution polymerization | Temperature, °C. | Pressure | Required Time for Defoaming, hr. |
|---|---|---|---|
| Prior Art | 60 | Normal | 40 |
| Filling up with reaction mixture leaving no space | 60 | do | 30 |
| Applying Pressure | 60 | 2 kg./cm.² | 12 |
| Present Invention | 60 | 2 kg./cm.² | 0 |

In the ordinary solution-polymerization, gel like substance tend to yield more or less in the solution, thereby the property suitable for spinning solution being deteriorated.

The present inventors have investigated the apparatus suitable for our solution-polymerization and spinning process in order to keep the polymer solution out of formation of foam and any gel substances from various point of view.

As a result, it has been realized that a homogeneous polymer solution can be prepared without any air foams and any gel-like substances and can be directly used as spinning solution by performing continuously polymerization filling up the polymerization apparatus with reaction mixture and applying pressure of 1 to 5 kg./cm.² gauge to reacting liquid in the reaction vessel by means of a reciprocating pump or other suitable device.

It will be understood from the foregoing that the present invention provides a process for continuous manufacturing of high grade acrylic fibers at low cost characterized in that, in concentrated aqueous zinc chloride solution, acrylonitrile is added with 8 to 12% copolymer to the whole monomers to be subjected to continuous solution polymerization under pressure of 1 to 5 kg./cm.² gauge in a reaction vessel eliminating any gas space formed, thus obtained polymer solution is instantly spun out in a coagulating bath at room temperature and of 20% or lower concentration salt and thus obtained coagulated tow is subjected to stretching over 8 times of its original length and then to relaxation over 20%, essential features of which lie in the indivisible combination of the series of steps.

It has been found that the concentration of aqueous zinc-chloride solution to be used in embodying the present invention is preferably 52 to 58%. The preferable range of the concentration is based on the fact that the lower it becomes the lower the viscosity of the obtained polymer solution. It is known that acrylonitrile polymer is apt to change chemically in aqueous zinc chloride solution. The tendency becomes remarkable as the concentration of zinc chloride increases. The chemical change causes the fibers easily to be colored and deteriorates the thermal stability thereof. Thus, in order to obtain a polymer solution suitable for spinning a relatively lower concentration of aqueous zinc chloride solution has to be used.

The above-referred to invention does not lose its characteristic features in any case follows when the solvent is consisted of just single component of zinc chloride, and also when consisted of zinc chloride and sodium chloride, and more over, when a small amount of any alcohol is added for controlling molecular weight of polymers or when acetic acid is added to make desalting from coagulated gel-tow easy and improve the thermal stability of the original polymer solution.

The practical examples of the continuous process for manufacturing acrylic series fibers of excellent quality:

*Example 1*

A monomer solution comprising 650 parts of 58% aqueous zinc chloride solution, 65 parts of acrylonitrile and 7 parts of methyl acrylate, which are uniformly mixed together, and a catalyser solution comprising 0.6 part ammonium persulfate dissolved in 30 parts of 58% aqueous zinc chloride solution are continuously introduced into a polymerization apparatus kept at 60° C. under pressure of 3 kg./cm.² without permitting any empty space, and the mixture is continuously polymerized to produce uniform, foamless and transparent solution of polymers in three hours. The resulting solution is directly spun through a spinnerlet of 2500 holes ($\phi=0.14$ mm.) into a coagulating bath of 10% aqueous zinc chloride solution at 20° C., the thus obtained gel-tow is stretched to 2 times of the original length in water at 60° C., dried by means of 120° C. heated rollers, then stretched to 5 times at 180° C. and subsequently relaxed by 30% in superheated steam at 250° C. The fiber thus obtained shows a dry strength of 3.5 g./d., a dry elongation 30%, and a knot strength of 2.8 g./d. and shrinkage in boiling water is below 1.0%.

According to this process, since the processes of drying, pulverizing, dissolving polymer and of defoaming polymer solution are not required, excellent fibers can be manufactured continuously at low cost in only 4 hours after the solution of monomers being charged.

Further, in this case, the relative conversion polymerization was 97%, molecular weight was $7.85 \times 10^4$ and the falling ball viscosity of the spinning solution measured at 80° C. was 48 seconds.

*Example 2*

600 parts of mixed aqueous salt solution comprising 52% zinc chloride and 4% sodium chloride are mixed with 57 parts acrylonitrile, 2.5 parts N-vinyl-4-($\beta$-hydroxyethyl)-imidazol, 3.5 parts methyl acrylate and 0.6 part ammonium persulphate, which are dissolved and continuously fed into a pressure-resistant vessel equipped with a stirrer and directly connected, with the spinning apparatus in a completely closed condition, and heated at 55° C. under the pressure 4 kg./cm.².

The said solution is subjected to polymerization passing through the vessel in 3 hours, and thus formed polymer solution is directly introduced to the spinning device to be spun as shown in Example 1. Thus obtained fibers showed the dry strength of 40 g./d., dry elongation of 25% and knot strength of 3.2 g./d. and showed excellent instantaneous recovery of elasticity, and can be dyed to deep colour with an acidic dyestuff.

*Example 3*

50 parts of acrylonitrile and 4 parts acrylamide and 1 part sodium allyl sulfonate are dissolved in a mixed aqueous solution comprising 200 parts zinc chloride, 100 parts sodium chloride, 15 parts isopropyl alcohol and 300 parts water to which is added 0.5 part potassium persulfate and can be continuously polymerized as shown in Example 2. Thus obtained solution is directly spun out in 5% aqueous solution of the mixture of salt described above. After washing with water, the spun tow is stretched to 12 times the original length with heating rollers and then subsequently it is given relaxation of 28% in superheated steam of 200° C. Thus obtained fibers showed a dry strength of 3.1 g./d., dry elongation of 28% and knot strength of 2.3 g./d. The fiber obtained can be dyed deeply with cationic dyestuff.

*Example 4*

Monomer mixture comprising 70 parts acrylonitrile, 4 parts methyl acrylate and 4 parts acrylic acid, which is dissolved in 650 parts of the solvent composed of 54% zinc chloride, 3% acetic acid and water, and the catalyst solution comprising ammonium persulfate in the same solvent are introduced continuously to the apparatus under pressure of 4 kg./cm.² and the polymer solution continuously obtained is spun directly in said 10% solvent aqueous solution at room temperature and the fibers obtained by stretching to 10 times the original length and giving 30% relaxation at 200° C. have high degree of whiteness, dry strength of 3.6 g./d. (dry elongation 28%), wet strength of 3.4 g./d. (31%), and knot strength of 2.8 g./d. (21%).

*Example 5*

Monomer mixture comprising 70 parts acrylonitrile, 5 parts methyl acrylate and 2 parts vinyl sulfonate, which are dissolved in 600 parts of 57% aqueous zinc chloride solution, and catalyst solution of 0.3 part hydrogen peroxide dissolved in 57% aqueous zinc chloride solution are introduced in an apparatus as shown in Example 2, and polymerized at 65° C. and a transparent polymer solution can be obtained in 4 hours. The said polymer solution thus obtained is directly spun as shown in Example 4. Thus obtained fibers can be dyed to a deep color with a cationic dyestuff, having excellent mechanical properties.

*Example 6*

Monomer mixture comprising 70 parts acrylonitrile and 7 parts methyl acrylate, which is dissolved in 650 parts of mixed aqueous salt solution containing 52% zinc chloride and 4% sodium chloride, and catalyst solution comprising 0.5 part ammonium persulfate and 1 part sodium thiosulfate dissolved respectively in 20 parts of aqueous solvent solution are introduced in an apparatus as shown in Example 3 and polymerized continuously. A transparent polymer solution without any foams can be obtained in 90 minutes, where the relative conversion is 96% and the molecular weight is $7.25 \times 10^4$. When this polymer solution is directly subjected to spinning operation as in Example 4, excellent fibers with good mechanical properties having splendid dyeability with cationic dyestuff can be obtained.

What we claim:

1. A process for the continuous manufacture of acrylic fibers comprising adding a 52 to 58% concentration of aqueous zinc chloride solution to a monomer mixture consisting of acrylonitrile and a comonomer of 8 to 12% by weight of said monomer mixture to form a solution of said monomer mixture in said aqueous zinc chloride solution, solution polymerizing by forcing the solution into a closed reaction vessel so that said solution has a range of pressure of 1 to 5 kg./cm.$^2$ by gauge whereby the resulting polymer solution contains no foam and gel substance, spinning said polymer solution into a coagulating bath of 20% or lower salt concentration at a temperature of 10° to 25° C., and subjecting the resulting tow to stretching over 8 times its original length and then relaxation over 20%.

2. A process as set forth in claim 1, wherein said 8 to 12 weight percent comonomer comprises a first component of a neutral vinyl comonomer and a second component selected from the group consisting of an acidic and basic vinyl comonomer for imparting dyeability.

3. A process set forth in claim 2, wherein said neutral vinyl comonomer is selected from the group consisting of methyl acrylate and acrylamide.

4. A process as set forth in claim 2 wherein said basic vinyl comonomer is selected from the group consisting of N-vinyl-4-(B-hydroxyethyl)-imadazole, N-vinyl-2-methyl-4-(B-hydroxyethyl)-imidazole, N-vinyl-4-(B-acetoxyethyl)-imidazole, and N-vinyl-4-(B-methoxyethyl)-imidazole.

5. A process as set forth in claim 2, wherein acidic vinyl comonomer is selected from the group consisting of vinyl sulfonic acid, acrylic acid, allyl sulfonic acid, meta allyl sulfonic acid, styrene sulfonic acid, and their soluble metal salts.

6. A process as set forth in claim 1, wherein an aqueous solution containing zinc chloride only is used as the polymerization medium and coagulating bath.

7. A process as set forth in claim 1, wherein a concentrated aqueous solution of zinc chloride with sodium chloride is used as the polymerization medium in which the zinc chloride is 52% and the sodium chloride is 4%.

8. A process as set forth in claim 1, wherein a mixture of concentrated aqueous zinc chloride solution with isopropyl alcohol is used as the polymerization medium in which the zinc chloride is 33% and the alcohol is 3%.

9. A process as set forth in claim 1, wherein a mixture of concentrated aqueous zinc chloride solution with acetic acid is used as the polymerization medium in which the zinc chloride is 54% and the acetic acid is 3%.

References Cited in the file of this patent

UNITED STATES PATENTS

| | | |
|---|---|---|
| 2,356,767 | Kropa | Aug. 29, 1944 |
| 2,648,647 | Stanton | Aug. 11, 1953 |
| 2,790,700 | Stanton | Apr. 30, 1957 |
| 2,793,199 | Kurtz | May 21, 1957 |
| 2,858,290 | Davis | Oct. 28, 1958 |
| 2,867,602 | Ham | Jan. 6, 1959 |
| 2,949,444 | Lawson | Aug. 16, 1960 |